United States Patent [19]

Achiaga Fustel

[11] Patent Number: 4,485,430
[45] Date of Patent: Nov. 27, 1984

[54] COMPLEMENTARY PROJECTOR FOR A MOTOR VEHICLE

[75] Inventor: Victor Achiaga Fustel, Bobigny, France

[73] Assignee: Cibie Projecteurs, Bobigny, France

[21] Appl. No.: 425,074

[22] PCT Filed: Jan. 21, 1982

[86] PCT No.: PCT/FR82/00013
§ 371 Date: Oct. 8, 1982
§ 102(e) Date: Oct. 8, 1982

[87] PCT Pub. No.: WO82/02522
PCT Pub. Date: Aug. 5, 1982

[30] Foreign Application Priority Data

Jan. 22, 1981 [ES] Spain .................................. 255709
Dec. 18, 1981 [ES] Spain .................................. 262138

[51] Int. Cl.³ ........................................... F21V 29/00
[52] U.S. Cl. .................................... 362/267; 362/80; 362/82; 362/269; 362/287; 362/370; 362/427

[58] Field of Search .................. 362/80, 82, 267, 269, 362/287, 370, 427; 293/134

[56] References Cited

U.S. PATENT DOCUMENTS 3,175,079  3/1965  Giesler ................................ 362/267
3,910,565 10/1975  Persicke et al. ..................... 293/134
3,929,370 12/1975  Farrell ................................ 293/134

Primary Examiner—Stephen J. Lechert, Jr.
Attorney, Agent, or Firm—Fiddler and Levine

[57] ABSTRACT

The present invention relates to auxiliary spotlights (headlamps) for automobile vehicles, for example fog and spot lamps. Such auxiliary spotlights generally comprise a sealed beam unit, i.e. a reflector-light source-glass assembly, housed in a casing forming a protective housing. A system of articulated assembly connects the casing to the automobile vehicle on which the spotlight is thus fixed by the outside.

7 Claims, 5 Drawing Figures

U.S. Patent Nov. 27, 1984 Sheet 1 of 2 4,485,430
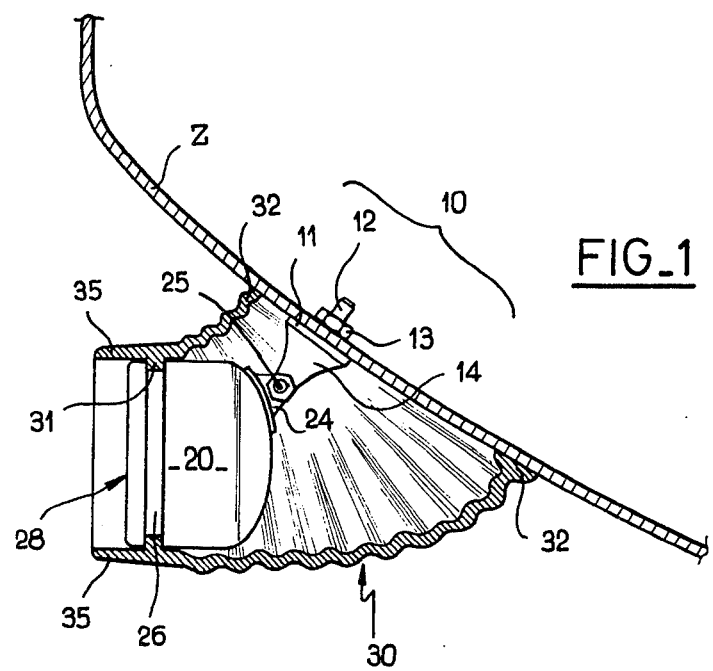
FIG_1
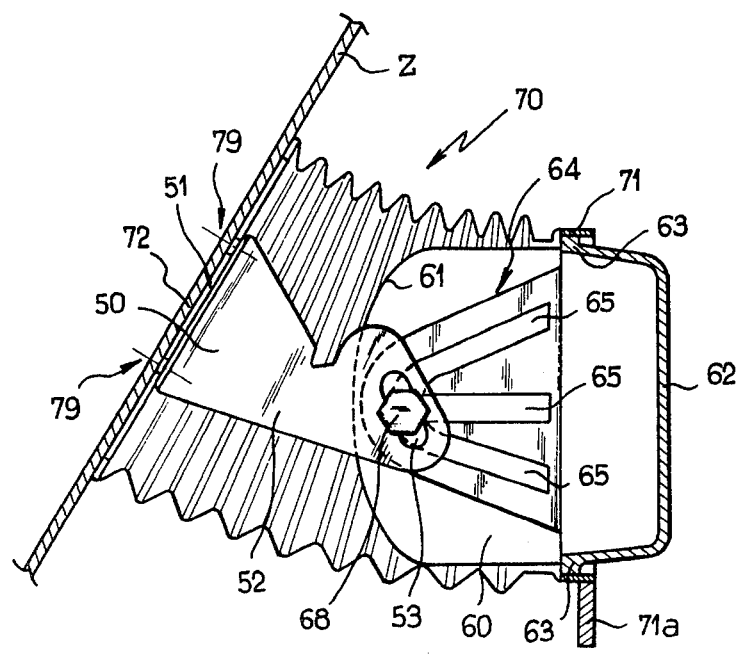
FIG_2

COMPLEMENTARY PROJECTOR FOR A MOTOR VEHICLE

Automobile manufacturers have recently proposed wrap-round bumpers which extend downwardly of the vehicle in streamline fashion.

There is a problem in mounting auxiliary spotlights on such wrap-round bumpers for which the conventional solutions prove to be inappropriate.

A first drawback of conventional auxiliary spotlights resides in the fact that their system of assembly does not enable them to be placed in position on inclined, re-entrant surfaces, particularly the surface of a wrap-round bumper.

Another drawback of conventional spotlights resides in the fact that their system of articulated assembly cannot, without serious risk of deterioration, be exposed to the projections of water, mud, stones, . . . which inevitably occur in the lower part of an automobile vehicle; similarly, the sealed beam unit must be particularly well protected against such projections.

Another drawback of conventional spotlights resides in the fact that their system of assembly is easily accessible from the outside and is therefore susceptible to untimely acts, particularly theft.

A further drawback of conventional spotlights resides in the fact that the system of assembly is not aesthetic and does not integrate in the stream line of a vehicle with wrap-round bumper.

It is an object of the present invention to remedy these drawbacks by a novel spotlight structure, particularly, but not exclusively, intended to be mounted on wrap-round bumpers.

The new structure enables the spotlight to be mounted at any point of an automobile vehicle, particularly in any zone of the bodywork or bumper independently of the inclination thereof.

The same spotlight may be mounted on all types of automobile vehicles.

In the mounted state, the system of assembly remains invisible, protected both from untimely acts and from outside agents.

More precisely, the spotlight according to the invention comprises, in combination, an assembly support adapted to be fixed on any zone of assembly of an automobile vehicle, a sealed beam unit able to be adjustably mounted on the assembly support, and a deformable tubular element surrounding both the assembly support and the sealed beam unit whilst being hermetically applied, on the one hand, against the periphery of the sealed beam unit and, on the other hand, against the zone of assembly of the vehicle.

The elastically deformable tubular element thus acts as a conventional casing with respect to the sealed beam unit, whilst ensuring protection of the assembly support. It will be noted that the deformable, and preferably elastically deformable character of the tubular element enables it to be mounted in any relative position of the zone of assembly of the automobile vehicle, the assembly support and the sealed beam unit, the deformable element adapting itself to any configuration of assembly. In addition, as will be seen in greater detail hereinafter, its deformable character allows, when assembled, easy access to the assembly support and to the sealed beam unit.

The deformable tubular element is preferably in the form of bellows, advantageously made of an elastomer material. The general form of the bellows, in the free state, may be arcuate to take into account the rearward and downward inclinations of the zones of assembly on the automobile vehicle (re-entrant bumper, for example).

In their front part, the bellows comprise elements adapted to cooperate with the periphery of the sealed beam unit. For example, the bellows comprise a rib cooperating with a groove in the sealed beam unit, or the bellows comprise a groove cooperating with a peripheral rib on the sealed beam unit.

In their rear part, the bellows comprise means for cooperating with the zone of assembly of the vehicle. In a preferred embodiment, the bellows comprise in their rear part an end wall which is gripped, at assembly, between the assembly support and the automobile vehicle.

According to a further feature, the bellows comprise a protecting flange which extends forwardly of the sealed beam unit, at least in its upper part, forming visor.

Other features and advantages of the invention will appear more clearly on reading the following description with reference to the accompanying drawings, in which:

FIG. 1 schematically shows, in vertical axial section, the spotlight according to the invention, mounted on the wrap-round bumper of an automobile vehicle, in a first embodiment.

FIG. 2 schematically shows, in side view, with section of the bellows, a spotlight according to the invention, in a second embodiment.

Figure 2A:
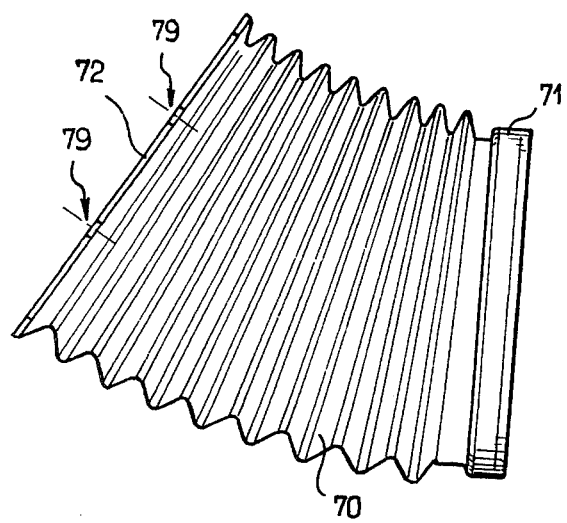
FIG. 2a shows the bellows of FIG. 2 separately, in non-assembled state.

FIG. 1 schematically shows the novel spotlight according to the invention mounted on a zone of assembly Z forming part of the wrap-round bumper of an automobile vehicle. It essentially comprise an assembly support 10, a sealed beam unit 20 and a deformable tubular element 30.

In the example shown, the support 10 comprises a base 11 adapted to be applied against zone Z, at least one threaded rod 12 adapted to pass through a hole made in the zone Z, and an assembly nut 13 screwed on rod 12, so that the zone Z is gripped between the base 11 and the nut 13. Finally, the assembly support comprises at least one plate 14.

The sealed beam unit 20 comprises in its rear part at least one pivoting plate 24. Plates 14 and 24 are pivoted on each other with the aid of at least one pivot pin 25. In this way, the sealed beam unit 20 may, despite any orientation of the zone Z, be returned to the horizontal, into its position of illumination and maintained in this position by tightening the pin 25. On its front periphery, the sealed beam unit 20 comprises a groove 26.

The tubular element 30 is, in the example shown, constituted by bellows which, in the free state, are slightly arcuate in form, as shown in FIG. 1. In their front part, the bellows comprise a rib 31 adapted to cooperate with groove 26. In their rear part, the bellows comprise an edge 32 adapted to be elastically and hermetically applied against the zone Z, in water-tight assembly.

It will be readily understood, on studying the embodiment of FIG. 1, that the bellows 30 ensure watertight protection of the assembly of the sealed beam unit 20 on the support 10. Due to their deformable nature, the bellows adapt themselves to any orientation of zone Z, i.e. to any angular position of the assembly support 10 and of the sealed beam unit 20. It is important to note that the bellows also protect the wiring supplying the sealed beam unit 20 (not shown).

The bellows 30 also protect the sealed beam unit 20 against shocks. They may advantageously comprise a protecting flange 35 extending forwardly of the glass 28 of the sealed beam unit 20 where it forms a visor.

In the example shown in FIG. 1 (assembly on a bumper), it is very simple to make one or more assembly holes in a bumper to engage each threaded rod 12 therein. In this case, assembly is simply effected by applying the assembly 10-20-30 against the bumper, the bellows 30 being previously mounted on the sealed beam unit 20; as the need arises, the deformability of the bellows 30 allows access to the pin 25.

A second embodiment of the invention is shown in FIGS. 2, 2a, 2b, 2c. As before, the spotlight comprises an assembly support 50, a sealed beam unit 60 and a deformable tubular element constituted by bellows 70 made of an elastomer material.

Figure 2B:
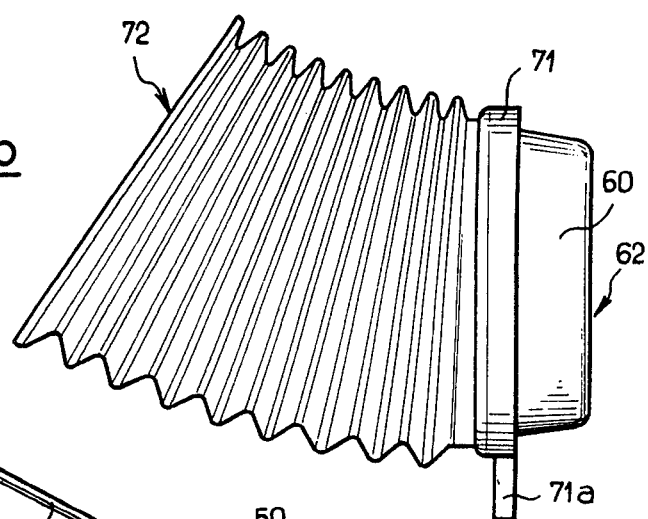
FIG. 2b shows in elevation the spotlight according to the invention comprising the bellows in the assembled state.
Figure 2C:
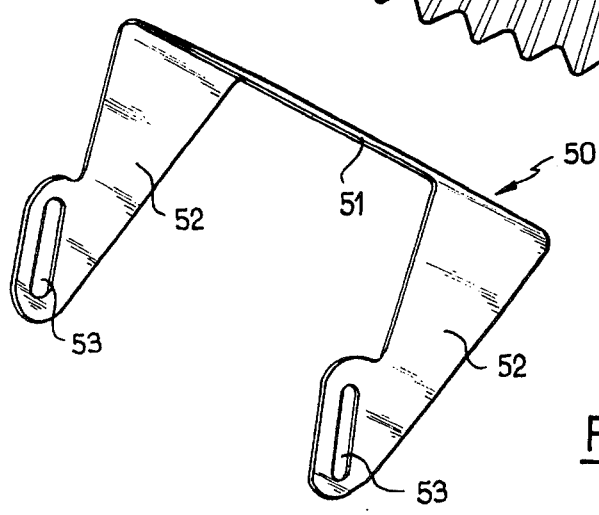
FIG. 2c shows in perspective the assembly support of the spotlight of FIG. 2, which is in the form of a stirrup.

The assembly support 50 is in the form shown in FIG. 2c, i.e. in the form of a stirrup comprising a base 51 and two arms 52 having substantially vertical slots 53 made therein.

The sealed beam unit 60 is constituted by a reflector 61 and a glass 62. At the join of the reflector and the glass, the unit comprises an outward swell 63. Finally, the sealed beam unit comprises two assembly lugs 64 provided with slots 65. The arms 52 of the stirrup 50 cooperate with the lugs 64 of the sealed beam unit 60 for relative pivoting of the sealed beam unit on the support. Pivot pins 68 pass through the homologous slots.

In the free state, the bellows 70 are in the form shown in FIG. 2b, and made of a synthetic rubber. They are compressible, with respect to the form of FIG. 2a. In their front part, they comprise a flange 71. In their rear part, they comprise a wall 72. The flange 71 is adapted to elastically cover the peripheral flange 63 of the sealed beam unit 60. Tongues such as 71a facilitate assembly or dismantling of the bellows 70 and of the sealed beam unit 60.

With such a structure, assembly of the spotlight according to the invention on a bodywork element is easy to understand. The support 50 is firstly mounted on zone Z, the wall 72 of the bellows being gripped between the support and the bodywork. This assembly is effected by screws, through holes such as 79, passing both through the support 50 and the wall 72 of the bellows. The support 50 and the bellows 70 thus being mounted on the bodywork of the vehicle, the sealed beam unit 60 is then mounted on the support 50, the bellows being returned rearwardly to allow final positioning of the sealed beam unit 60 with respect to the support 50 and the tightening of pins 68. This having been done, the bellows 70 are returned forwardly so that their flange 71 covers the peripheral flange 63 of the sealed beam unit 60.

The bellows 70 are thus hermetically applied against the zone Z and against the peripheral flange 63 of the sealed beam unit 60. They ensure protection of the assembly and of the sealed beam unit 60 and continue the lines of the sealed beam unit 60 up to the automobile vehicle; due to their deformability, the spotlight may be mounted on any zone such as Z, independently of its orientation.

I claim:

1. An auxiliary spotlight for securing to the outside of an automobile vehicle having an assembly support (10, 50) for fixing on any zone of assembly (Z) of the automobile vehicle and a sealed beam unit (20, 60) adjustably mountable on the assembly support (10, 50), said light comprising: a deformable tubular element (30, 70) engaged with the front peripheral zone (26, 63) of said beam unit, surrounding both the assembly support and the sealed beam unit and hermetically applied against said zone of assembly of the vehicle.

2. An auxiliary spotlight according to claim 1, in which said tubular element is elastically deformable.

3. An auxiliary spotlight according to claim 2, in which said deformable tubular element is constituted by belows (30, 70).

4. An auxiliary spotlight according to claim 3 in which said bellows (30, 70) are generally arcuate in form, in the free state.

5. An auxiliary spotlight according to claim 3 or 4 in which said bellows (70) comprise a front wall (72); the assembly support (50) comprises a base (51), said base (51) pressing said wall (72) against the zone of assembly (Z).

6. An auxiliary spotlight according to one of claims 3 or 4 in which said bellows (70) comprise a peripheral flange (71) adapted to cooperate with a homologous peripheral element (63) of the sealed beam unit (60).

7. An auxiliary spotlight according to one of claims 1, 2, 3, or 4, in which said assembly support (50) comprises assembly arms (52), the sealed beam unit (60) comprises assembly lugs (64), and the pivoting of the sealed beam unit (60) on the support (50) is effected by homologous slots (53, 65) made in said arms and said lugs, through which pass pivot pins (68) for assembly.

* * * * *